United States Patent
Creamer et al.

(10) Patent No.: US 7,472,184 B2
(45) Date of Patent: Dec. 30, 2008

(54) FRAMEWORK FOR RESTRICTING RESOURCES CONSUMED BY GHOST AGENTS

(75) Inventors: Thomas E. Creamer, Boca Raton, FL (US); Bill H. Hilf, La Habra, CA (US); Peeyush Jaiswal, Boca Raton, FL (US); Neil A. Katz, Parkland, FL (US); Michael Mirt, Deerfield Beach, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 10/666,310

(22) Filed: Sep. 19, 2003

(65) Prior Publication Data

US 2005/0065994 A1 Mar. 24, 2005

(51) Int. Cl.
*G06F 15/173* (2006.01)
(52) U.S. Cl. ............... 709/224; 709/202; 709/229; 714/25; 714/38; 717/127
(58) Field of Classification Search ........... 709/202, 709/224, 229; 714/25, 38; 717/127
See application file for complete search history.

(56) References Cited

U.S. PATENT DOCUMENTS

| | | | |
|---|---|---|---|
| 6,012,152 A | 1/2000 | Douik et al. | |
| 6,083,281 A | 7/2000 | Diec et al. | |
| 6,105,059 A | 8/2000 | Al-Karmi et al. | |
| 6,122,664 A * | 9/2000 | Boukobza et al. | 709/224 |
| 6,266,805 B1 | 7/2001 | Nwana et al. | |
| 6,269,330 B1 * | 7/2001 | Cidon et al. | 714/43 |
| 6,282,697 B1 * | 8/2001 | Fables et al. | 717/107 |
| 6,339,423 B1 * | 1/2002 | Sampson et al. | 715/854 |
| 6,427,000 B1 | 7/2002 | Mumford et al. | |
| 6,430,707 B1 | 8/2002 | Matthews et al. | |
| 6,564,342 B2 * | 5/2003 | Landan | 714/48 |
| 6,681,243 B1 * | 1/2004 | Putzolu et al. | 709/202 |
| 2002/0112048 A1 * | 8/2002 | Gruyer et al. | 709/224 |
| 2002/0162053 A1 | 10/2002 | Os | |
| 2002/0174415 A1 | 11/2002 | Hines | |
| 2003/0014691 A1 | 1/2003 | Abdelilah et al. | |

(Continued)

OTHER PUBLICATIONS

U.S. Appl. No. 10/665,586, Creamer et al.

(Continued)

*Primary Examiner*—Jeffrey Pwu
*Assistant Examiner*—Thomas J Dailey
(74) *Attorney, Agent, or Firm*—Akerman Senterfitt (57) ABSTRACT

A method for restricting resources consumed by a ghost agent can include the step of identifying a host, which is a software object operating within the grid environment and movable from one grid to another grid within the grid environment. The method also can include the step of associating a ghost agent with the host. The ghost agent is configured to replicate and record at least one action of the host and follows the movement of the associated host. Additionally, the ghost agent can be registered with a ghost registry of the domain in which it is disposed. Once registered, a containment policy for the domain can be received by the ghost agent. The ghost agent can be configured according to the received containment policy. The containment policy can be utilized to restrict resources that are available to the ghost agent.

6 Claims, 5 Drawing Sheets

U.S. PATENT DOCUMENTS

| | | |
|---|---|---|
| 2003/0028858 A1 | 2/2003 | Hines |
| 2004/0103195 A1* | 5/2004 | Chalasani et al. ............ 709/226 |
| 2004/0103339 A1* | 5/2004 | Chalasani et al. .............. 714/4 |
| 2004/0139202 A1* | 7/2004 | Talwar et al. ................ 709/229 |
| 2004/0225711 A1* | 11/2004 | Burnett et al. .............. 709/201 |

OTHER PUBLICATIONS

U.S. Appl. No. 10/666,464, Creamer et al.

Fox, A., et al., "Cluster-Based Scalable Network Services", ACM Digital Library, pp. 78-91, (Oct. 1997).

Wilson, L.F., et al., "Mobile Agents for Distributed Simulation", 1999 Advanced Simulation Technologies Conference, pp. 53-58, 1999.

Kapolka, A., et al., "A Unified Component Framework for Dynamically Extensible Virtual Environments", CVE '02, pp. 64-71, (Sep. 30-Oct. 2, 2002).

Martin, D.M., Jr., et al., "The Privacy Practices of Web Browser Extensions", Communications of the ACM, vol. 44, No. 2, pp. 45-50, (Feb. 2001).

* cited by examiner

FRAMEWORK FOR RESTRICTING RESOURCES CONSUMED BY GHOST AGENTS

BACKGROUND

1. Field of the Invention

The present invention relates to the field of computer science and, more particularly to a framework for restricting resources consumed by ghost agents disposed within a grid environment.

2. Description of the Related Art

A grid environment is a distributed computing environment where computing, application, storage, and/or network resources can be shared across geographically disperse organizations. An ideal grid environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid environment, such as Avaki's data grid from Avaki of Burlington, Me. and Grid MP Enterprise from United Devices of Austin, Tex. Further, a number of readily available toolkits and standards have been developed for creating a grid environment including, for example, the Globus Toolkit provided by the Globus project and the Open Grid Services Architecture (OGSA).

A grid environment can include multiple applications. Each application can include a set of computing resources that performs a series of related tasks. Examples of applications include, but are not limited to, word processors, database programs, Web browsers, development tools, drawing applications, image editing programs, and communication programs. The various computing resources for one application can be distributed across several different grids within a grid environment, wherein each grid can contain a myriad of diverse hardware components, such as communication lines, networking routers, servers, workstations, peripherals, intranets, and the like.

The interdependencies that exist among applications and hardware resources in a grid environment can make it difficult for providers of grid-based applications to perform testing, installation, monitoring, and maintenance tasks. One such difficulty relates to induced environmental interferences. That is, methods for performing the above listed tasks can consume significant computing resources of the grid environment, which can be referred to as overhead. The overhead can affect operational characteristics of the grid environment. Consequently, results from the listed tasks can be compromised by the overhead resulting from task execution. If the amount of resources used in performing the listed tasks can be constrained, however, the disruptions induced by the tasks can be minimized.

Conventional methods for controlling the privileges granted to system resources include such methodologies as Java's sand box model by Sun Microsystems of Palo Alto, Calif., Free BSD's "jail" function by the FreeBSD Foundation, and Linux's chroot "jail" function. None of these methodologies, however, can provide resource consumption controls flexible enough to be generically utilized within a grid environment. Consequently, a new methodology is required that reduces undesirable perturbations resulting from overhead.

SUMMARY OF THE INVENTION

The present invention provides a method, a system, and an apparatus for establishing a framework for restricting the resources consumed by ghost agents. More specifically, a ghost agent can be identified within a domain of a grid environment, where the ghost agent can be associated with a software object called a host in order to log actions of the host. Once identified, the ghost agent can register itself with a ghost registry for the domain. The ghost registry can then convey a containment policy to the ghost agent. The ghost agent can adhere to the received containment policy, thereby limiting the resources the ghost agent can consume. If a quantity of resources consumed by the ghost agent meets or exceeds one or more established thresholds, the ghost agent can be deactivated for a period. A deactivated ghost agent can be incapable of executing resource consuming operations. Additionally, the ghost agent can be removed from the domain. When removed, the ghost agent can be de-registered from the ghost registry.

One aspect of the present invention can include a method for restricting resources consumed by ghost agents within a domain of a grid computing environment. The method can include the step of identifying a host, which is a software object operating within the grid environment and movable from one grid to another grid within the grid environment. The method also can include associating a ghost agent with the host. The ghost agent is configured to replicate and record at least one action of the host and follows the movement of the associated host. Additionally, the ghost agent can be registered with a ghost registry of the domain in which it is disposed. Once registered, a containment policy for the domain can be conveyed to the ghost agent. The ghost agent can be configured according to the containment policy, which can be utilized to restrict resources that are available to the ghost agent.

For example, a resource utilization value for the ghost agent can be first determined and then compared to a limit established by the containment policy. If the limit is met or exceeded, the ghost agent can be prevented from executing one or more operations. One arrangement for preventing operations from being executed can involve deactivating the ghost agent for a period. A deactivated ghost agent can be a ghost agent that is unable to execute operations. An idle timer can be provided for the ghost agent, which can be started when the ghost agent is deactivated. When the idle timer exceeds a time threshold, the ghost agent can be reactivated.

In one embodiment, a default containment policy can be established for the ghost agent. When the ghost agent is configured according to the containment policy specified within the domain, the default containment policy can be overridden. If the ghost agent is removed from the domain, the ghost agent can be de-registered from the domain. Further, when the ghost agent is de-registered, the containment policy of the ghost agent can be configured according to the default containment policy.

In another embodiment, the containment policy of the domain can be dynamically altered. For example, the limits of the containment policy can be altered based upon which ghost agents are registered within the domain. Whenever the containment policy is altered, the alterations can be broadcasted to the ghost agents registered with the domain.

Another aspect of the present invention can include a framework including a ghost registry and one or more ghost agents. The ghost registry can be disposed within a domain of a grid environment. The ghost registry can include a containment policy for the domain in which it is disposed. The ghost registry can further include a policy engine. The policy engine can dynamically alter resource consumption limits of the containment policy based upon which ghost agents are registered with the domain. The ghost agents can move from domain to domain within the grid environment. When the ghost agents are disposed within the domain, the ghost agents can adhere to the containment policy for the domain. The framework can also include one or more registry agents. The registry agents can exchange data between the ghost registry and the ghost agents.

In one embodiment, the framework can include a different ghost registry in a different domain of the grid environment having a different containment policy. When ghost agents are disposed within the different domain, the ghost agents can adhere to the different containment policy. In another embodiment, the ghost agents can include a ghost containment policy. When the ghost agents are disposed within a domain that has no ghost registry, the ghost agents can adhere to the ghost containment policy.

Yet another aspect of the present invention can include a ghost agent including an operation queue, an interface, a ghost log, a ghost controller, and/or a ghost identifier. The ghost agent can move within a grid environment to follow movements of an associated host. The operation queue can queue operations for execution by the ghost agent. The interface can associate the ghost agent with a host. The ghost log can record data relating to the host. The ghost controller can manage interactions between the ghost agent and a grid environment. The ghost controller can also establish which resources are available to the ghost agent. Additionally, the ghost controller can vary the resources available to the ghost agent based upon the domain within which the ghost agent is disposed. The ghost identifier can identify the ghost agent to components within the grid environment. A means for disassociating the ghost agent from the host and a means for associating the ghost agent with a different host can be provided. Further, a means for registering the ghost agent with a domain and a means for de-registering the ghost agent with the domain can be provided.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention can provide a method, system, and apparatus for implementing a framework that restricts the resources consumed by ghost agents. A ghost agent can be a self-managing, self-identifying software object configured to associate themselves with hosts, where a host can be a software object. Any suitable technique can be used to attach the ghost agent to the host including, but not limited to, debugging attachment techniques, system calibration techniques, hardware performance testing techniques, and similar binding methodologies. Ghost agents can replicate the actions of the associated hosts and perform operations on the replicated actions. In one embodiment, ghost agents can record actions performed by the hosts to generate a log of host activities. Additionally, the ghost agents can determine a time required to execute host actions, the resources consumed in executing host actions, and/or the load upon system components while executing host actions.

The resources consumed by the ghost agents can be restricted using a containment policy. The containment policy can establish resource usage limitations that can be compared to resource utilization values determined for the ghost agent. If a limitation is met or exceeded, the ghost agent can be deactivated for a specified period. A deactivated ghost agent is one that does not consume computing resources. Different domains of a grid environment can establish different containment policies. Accordingly, when a ghost agent moves from one domain to another, an appropriate containment policy can be conveyed to the ghost agent. The ghost agent can be configured according to the conveyed containment policy.

Figure 1:
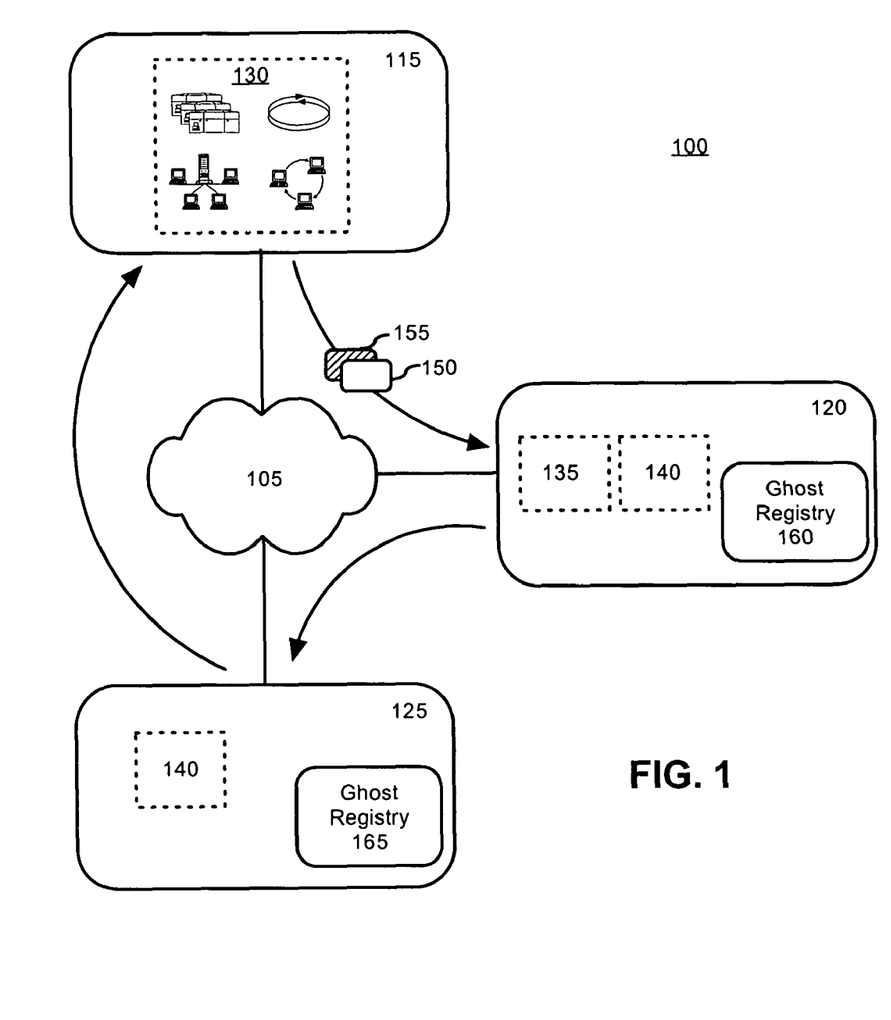
FIG. 1 is a schematic diagram illustrating an exemplary grid environment enabled for ghost agents and hosts in accordance with the inventive arrangements disclosed herein.

FIG. 1 is a schematic diagram illustrating an exemplary grid environment 100 enabled for ghost agents and hosts in accordance with the inventive arrangements disclosed herein. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

As used herein, computing resources can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The grid environment 100 infrastructure can include components that utilize any hardware platform, operating system, storage scheme, and software resource. In order to be integrated within the grid environment 100, each computing component can be communicatively linked to the grid environment 100 through the network 105. Each computing component can also adhere to the standards and protocols defined within the architecture of the grid environment 100.

The grid environment 100 can include grids 130, 135, and 140. Each grid can represent a grouping of physically differentiable hardware resources. The grid environment 100 can also include domains 115, 120, and 125. Each domain can be a logical segment of the grid environment 100 that establishes policies and rules for ghost agents 155 disposed within the domain. It should be noted that the domain segmentations do not necessary correlate to grid segments. For example, domain 115 can consist of grid 130, domain 120 can include grid 135 and a portion grid 140, and domain 125 can include a different portion of grid 140.

Grids 130, 135, and 140 can include a multitude of mainframe or supercomputers. Additionally, grids 130, 135, and 140 can include several local area networks, workgroups, and computing arrays. The grids 130, 135, and 140 can also include computing resources arranged according to any topography including, but not limited to, star topographies, Fiber Distributed Data Interface (FDDI) rings, token rings, and the like. One of ordinary skill in the art can appreciate that the invention is not to be limited in this regard, that any hardware resources, topography, and software can be included in the grid environment 100, and that such arrangements are contemplated herein.

Ghost agent 155 can be associated with host 150. Host 150 can be a software object capable of moving from one domain to another within the grid environment 100. For example, the host 150 can move from domain 115 to domain 120. Whenever the host 150 moves, the associated ghost agent 155 can move accordingly. When a ghost agent 155 moves into domain 120, the ghost agent 155 can register with ghost registry 160. Additionally, when the ghost agent 155 moves from domain 120 to another domain, the ghost agent 155 can be de-registered from ghost registry 160.

Ghost registry 160 can establish a containment policy for domain 120. The containment policy can restrict the resources available to the registered ghost agents. Similarly, ghost registry 165 can establish a containment policy for domain 125. Because domain 115 does not include a ghost registry, ghost agents disposed in domain 115 can adhere to a default containment policy.

Figure 2:
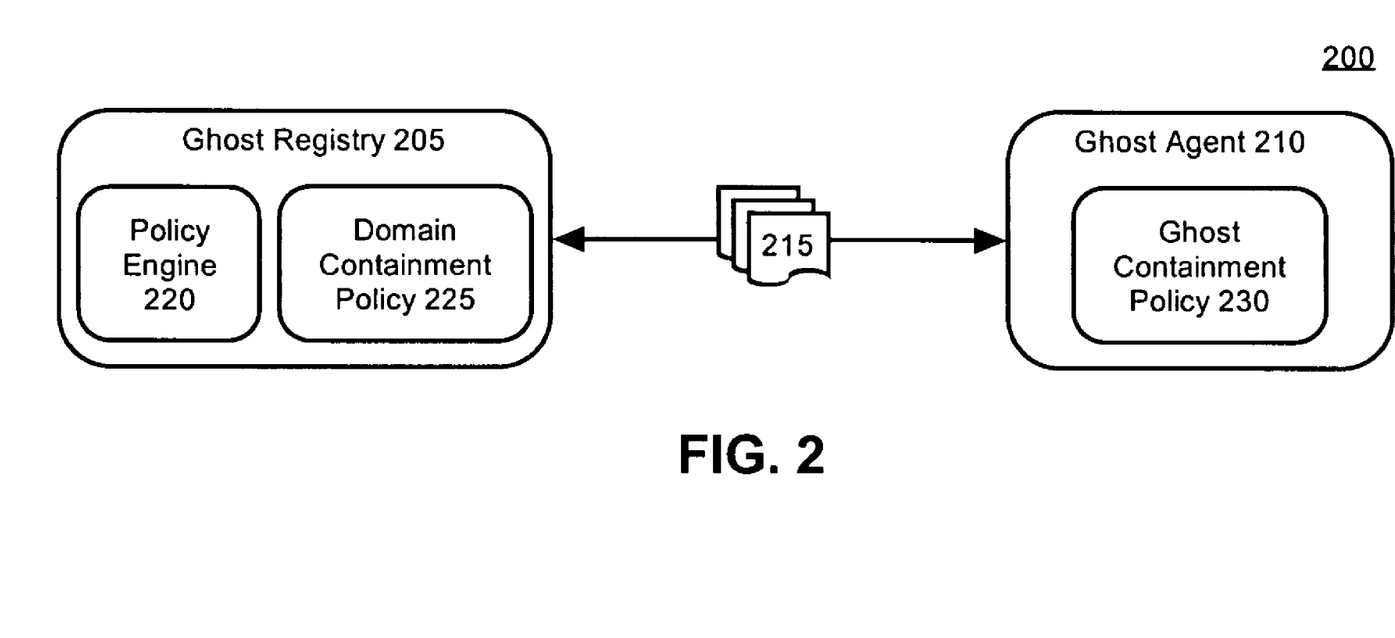
FIG. 2 is a schematic diagram for a system illustrating an exemplary ghost registry in accordance with the inventive arrangements disclosed herein.

FIG. 2 is a schematic diagram for a system 200 illustrating an exemplary ghost registry 205 in accordance with the inventive arrangements disclosed herein. The system 200 can include ghost registry 205, ghost agent 210, and registry agents 215. The ghost registry 205 can establish rule based policies applicable to ghost agents 210 disposed within the domain of the ghost registry 205. Ghost registry 205 can include a policy engine 220 and a domain containment policy 225.

The policy engine 220 can contain rules and algorithms used to generate the limitations and/or resource allocations specified within the domain containment policy 225. In one embodiment, the policy engine 220 can include a multitude of preconfigured limitations. Specific ones of the limitations can be used to construct the domain containment policy 225. For example, a highly restrictive set of resource limitations can be established on weekdays from nine to five, when the quantity of non-utilized grid resources can be scarce. A less restrictive set of resource limitations can be established for other times.

In another embodiment, the policy engine 220 can dynamically modify the domain containment policy 225 based at least in part upon the ghost agents registered within the ghost registry 205. For example, if N ghost agents are in a domain having M resources dedicated to ghost agents, M/N resources can be available to each ghost agent in the domain. Other more complicated dynamic resource allocation schemes are also possible.

For example, the ghost agent 210 can include a resource priority value. A running sum of the resource priority values for registered ghost agents can be maintained by the policy engine 220. Resource limitations can be established according to the priority values and the running sum value. For instance, if ghost agent 210 has a priority value of nine and the running sum value equals one hundred, the ghost agent 210 can be allocated nine percent (or 9/100) of the domain resources allocated to ghost agents.

The domain containment policy 225 can establish resource limitations for all ghost agents disposed within a designated domain. The domain containment policy 225 can establish one or more resource utilization thresholds and one or more corresponding deactivation times. Whenever the quantity of resources consumed by the ghost agent 210 meets or exceeds an established resource utilization threshold, the ghost agent 210 can be deactivated for a period equal to a specified deactivation time. A deactivated ghost agent can be a ghost agent that does not consume computing resources. Once the specified deactivation time passes, the ghost agent can be re-activated so that the ghost agent can perform operations that consume computing resources.

The ghost agent 210 can contain a ghost containment policy 230. The ghost containment policy 230 can include a default containment policy that can be utilized when no other containment policy is established for ghost agent 205. When the ghost agent 210 registers with the ghost registry 205, the domain containment policy 225 can be conveyed to the ghost agent 210. The conveyed domain containment policy 225 can override the ghost containment policy 230. When the ghost agent 210 de-registers from the ghost registry 205, the registry established policy can be cleared from the ghost agent 210 and the default containment policy can be reestablished. In one embodiment, the ghost containment policy 230 can include an overmaster parameter. The overmaster parameter can indicate that the ghost containment policy 230 cannot be overridden by the domain containment policy 225.

One or more registry agents 215 can convey data between the ghost registry 205 and the ghost agent 210. The registry agents 215 can be domain-specific software objects configured to move within the domain. The registry agents 215 can be used to register and to de-register the ghost agents 210. Further, the registry agents 215 can convey domain containment policy 225 changes to registered ghost agents 210.

Figure 3:
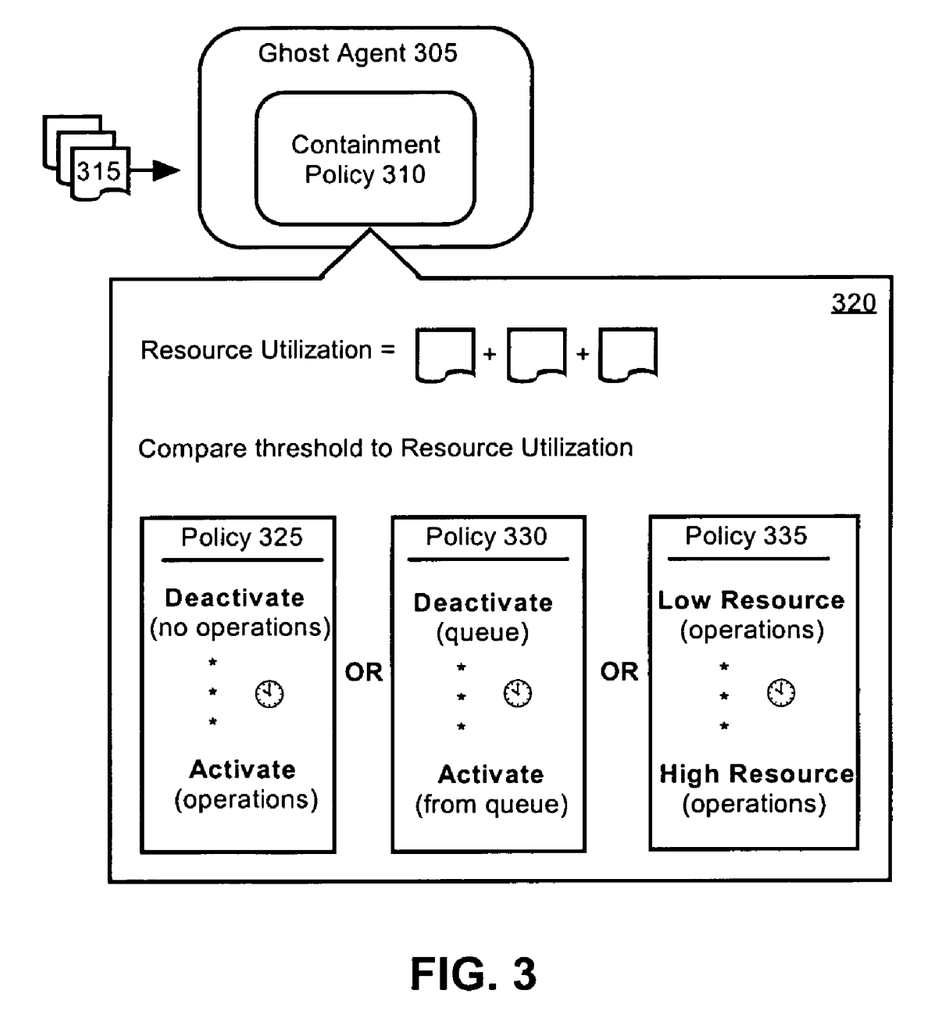
FIG. 3 is a schematic diagram of a exemplary ghost agent including a containment policy that restricts the resources that the ghost agent can consume in accordance with one embodiment of the inventive arrangements disclosed herein.

FIG. 3 is a schematic diagram of a ghost agent 305 including a containment policy 310 that restricts the resources that ghost agent 305 can consume in accordance with the inventive arrangements disclosed herein. The containment policy 310 can establish resource usage limitations. When these limitations are exceeded, the resource consumption of the ghost agent 305 can be reduced in a manner specified within the containment policy 310. The resource usage limitations can be compared to values calculated from one or more resource usage messages 315. The record usage messages 315 can be generated by resource providing grid components and/or by grid monitoring elements. Record usage messages 315 can specify a utilization of at least one computing resource, such as CPU cycles, storage space, and network capacity. It should be noted that any of a variety of different computing resources can be specified within the resource usage messages 315 and that the invention is not limited in this regard.

Exploded section 320 illustrates a few exemplary methods in which the containment policy 310 can constrain the resources used by the ghost agent 305. In exploded section 320, the first step in constraining resources involves calculating a resource utilization value. The resource utilization value can be calculated based upon the resource usage messages 315. For example, the resource utilization value can be the summation of multiple resource usages specified by within the resource usage messages 315. In a different example, the resource utilization can be equal to the greatest usage value obtained from the usage messages 315. Alternately, the resource utilization can be an average, mean, medium, and the like calculated from the usage values. In still another example, each usage value can be multiplied by an established weight. The resource utilization can be the sum of the weighted usage values.

Once the resource utilization is determined, the resource utilization can be compared to a defined threshold or limitation. The defined threshold can be based on the quantity of resources consumed by the ghost agent 305 as well as resources consumed by the ghost agent 305 and/or the quantity of resources consumed by software objects associated with the ghost agent 305. If the resource utilization meets or exceeds the usage threshold, the quantity of resources that are consumed by the ghost agent 305 can be reduced. Reduction methods used can include methods specified in policies 325, 330, and 335.

In policy 325, the ghost agent 305 can be deactivated so that the ghost agent 305 is not able to execute operations. Attempted operations during this deactivation period can be discarded. After a designated time specified within the containment policy 310, the ghost agent 305 can be reactivated. When re-activated, the ghost agent 305 can once again execute attempted operations.

In policy 330, the ghost agent 305 can also be deactivated so that the ghost agent 305 is not able to execute operations. In policy 330, however, attempted operations during this deactivation period are queued. After a designated time specified within the containment policy 310, the ghost agent 305 can be activated. Once activated, the ghost agent 305 can execute queued operations, according to a queue priority order. Accordingly, when policy 330 is implemented, operations attempted during the deactivation period are not discarded, but are instead delayed.

In policy 335, the ghost agent 305 can be restricted to the execution of operations that consume a low quantity of resources. Accordingly, some manner of specifying whether an attempted operation consumes a high or a low quantity of resources must be available. For example, a lookup table can be accessible that categorizes ghost resources into a low resource consumption or a high resource consumption category. In another example, the procedures and functions of the ghost agent 305 can self-specify whether a high or low quantity of resources is required. The restriction allowing only operations having low resource requirements to be executed can persist for a designated time period, after which operations that consume a high quantity of resources can be executed. It should be appreciated that the containment policy 310 is not limited to policy 325, policy 330, and/or policy 335, and that any of a variety of policies can be utilized herein.

Figure 4:
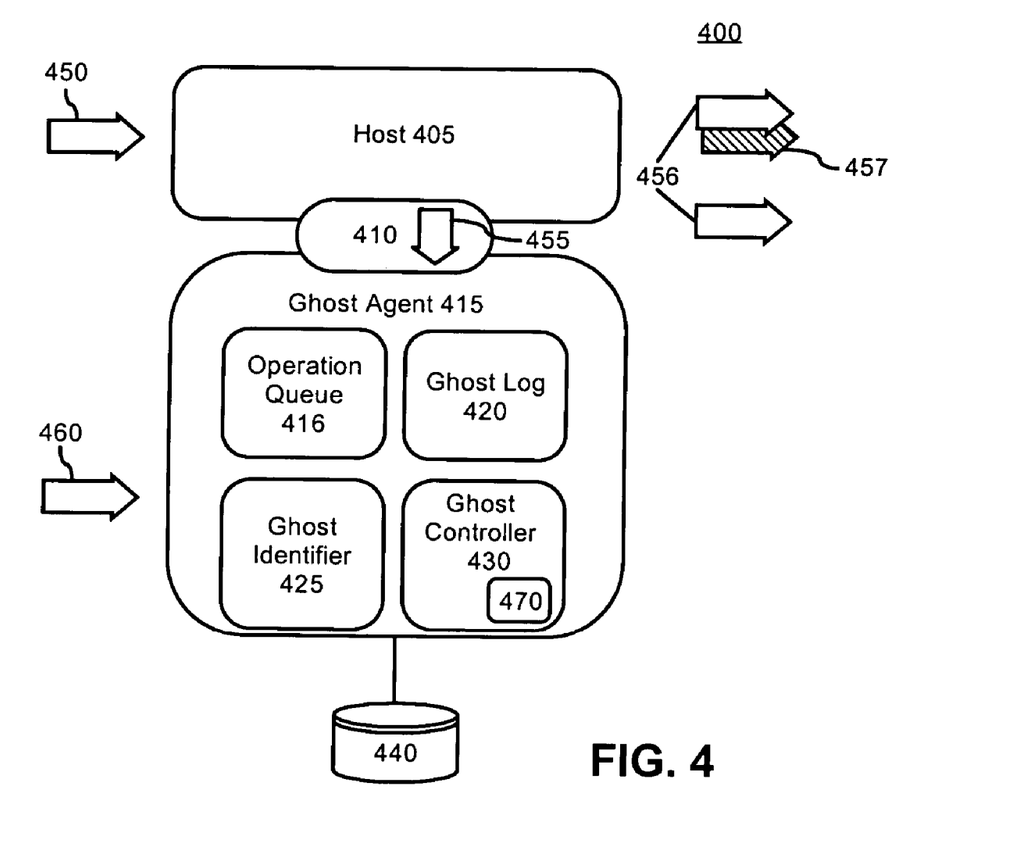
FIG. 4 is a schematic diagram illustrating a host and a ghost agent within a grid environment in accordance with the inventive arrangements disclosed herein.

FIG. 4 is a schematic diagram illustrating a host 405 and a ghost agent 415 within a grid environment 400 in accordance with the inventive arrangements disclosed herein. The grid environment 400 can be a distributed computing environment that includes a multitude of hardware and software components that provide computing resources. The computing resources of the grid environment 400 can be accessible on an as needed basis to a multitude of applications, users, and organizations. The grid environment 400 can include any hardware platform, operating system, storage scheme, and/or software resource that adhere to the standards and protocols defined for the grid environment 400.

The host 405 can be any definable software unit within the grid environment 400 that can receive input 450 and execute actions 456. The input 450 can include messages of any type conveyed to the host 405, such as keyboard input, procedural calls, and the like. The actions 456 can be relatively high-level actions as well as low-level actions. High-level actions can include calls to software routines that can contain one or more external procedural calls. Low-level actions can include hardware device calls and the execution of one or more processes or threads.

The ghost agent 415 can be associated or bound to the host 405 though the ghost interface 410. The ghost interface 410 can generate replicated actions 455 that are copies of the actions executed by the host 405, using any of a variety of suitable techniques. For example, techniques used by software debugging programs to attach monitors to running programs in order to evaluate system behavior and step through code can be used by the ghost interface 410. Alternatively, techniques used by system calibration and hardware performance testing utilities can be used by the ghost interface 410 to bind the ghost agent 415 with the host 405. Further, operating system level commands, tools, and functions analogous or similar to the UNIX commands "strace" and "ptrace," can potentially be used by the ghost interface 410 to bind the host 405 with the ghost agent 415. Strace is a commonly used system call trace, i.e. a debugging tool that prints out a trace of all the system calls made by another process and/or program. Additionally, ptrace is a commonly used system call that enables one process to control the execution of another. Ptrace also enables a process to change the core image of another process.

In one embodiment, the ghost interface 410 can be implemented as one or more Java software objects. In such an embodiment, the ghost interface 410 can cause a Java Web server to be initialized with the Java debugging command, "java_g." The ghost interface 410 can utilize a Java debugging object to replicate the actions of the host 405 and convey the replicated actions 455 to the ghost agent 415. Additionally, passwords provided by the host 405 can be echoed via the ghost interface 410 and used to authorize the ghost agent 415 as appropriate.

In another embodiment that functions within a Java environment, both the host 405 and the ghost agent 415 can be implemented as different Java classes such that the ghost interface 410 can appropriately convey messages between the host 405 and ghost agent 415 classes. In yet another embodiment, the ghost interface 410 can be implemented using a Java/Tcl blend, where Tcl is a computing language that interoperates with Java code segments. In that embodiment, the ghost interface 410 can use the "java::bind" command to generate callback scripts from events in the host 405. The callback scripts can replicate actions for the ghost agent 415.

The embodiments of the ghost interface 410 disclosed herein are not restricted to the Java programming language as one of ordinary skill in the art can utilize any of a variety of programming languages and techniques. For example, the ghost interface 410 can be implemented using a GNU debugger distributed by the Free Software Foundation and an Apache server distributed by the Apache Software Foundation. The GNU debugger can be attached to an Apache server causing all activity occurring within the server to be directed to the GNU debugger. The host 405 can be disposed within the Apache server so that the ghost agent 415 can utilize replicated actions of the host 405 provided by the GNU debugger.

Regardless of how the ghost interface 410 is implemented, the ghost agent 415 can manipulate the replicated actions 455 when performing ghost operations. The replicated actions 455 can be passive or "read only" actions that have no operational effect upon the grid environment 400 other than, perhaps, consuming a portion of the computing resources of the grid environment 400. Accordingly, in particular embodiments, the passive actions can be stored within the ghost agent, yet not be broadcasted into the grid environment 400. For example, a passive action can involve analyzing a replicated action to determine performance metrics, resource utilization metrics, and/or estimated load metrics relating to the replicated action. The ghost agent 415 can also generate one or more active actions 457 that are executed within the grid environment 400.

The ghost agent 415 can include an operation queue 416, a ghost log 420, a ghost identifier 425, and a ghost controller 430. The operation queue 416 can establish an order in which ghost operations are to be performed using any of a variety of known queuing algorithms. For example, the operation queue 416 can be a simple first-in-first-out (FIFO) queue. In another example, the operation queue 416 can establish an execution order based upon operation-specific priority values. In yet another example, the operation queue 416 can prioritize operations according to the resources required to execute the respective operations. The operation queue 416 can also establish a weighted prioritization scheme that balances available computing resources, the computing resources required for individual operations, and established operation preference values.

The ghost log 420 can record the data relating to the replicated actions 455, such as debugging actions, validation actions, and testing actions, thereby creating a log. The ghost log 420 can also receive and record resource usage data from one or more sources so that the ghost agent 415 can responsively determine resource usage values. For example, the ghost log 420 can receive a system message specifying the amount of storage space consumed by the ghost agent 415. The ghost agent 415 can responsively determine a resource usage value signifying a level of the storage space consumed. This resource usage value can be temporarily stored in the ghost log 420. The ghost agent 415 can periodically retrieve resource usage values as necessary from the ghost log 420 to calculate the resource utilization value, which is used to restrict the resources consumed by the ghost agent 415.

The ghost log 420 can be configured to record all activities relating to the associated host 405 or can be configured to record only selected activities. For example, the ghost log 420 can record a statistically relevant portion of actions, such as recording data relating to every $n^{th}$ replicated action 455 or every $n^{th}$ validation comparison. The ghost log 420 can also capture system information and add annotations from this system information to the generated log.

For example, system clock information can be captured and used to annotate the time between receiving a replicated action 455 and the completion time for an associated active action 457. Operational metrics, including load metrics, for the replicated action can be gathered in this fashion. In another example, metadata information contained within message flows, such as input 450, and active action 457, can be recorded and/or utilized by the ghost log 420. Additionally, the ghost log 420 can time stamp data relating to replicated actions 455.

The ghost log 420 can also record the log information in a ghost log repository 440. The ghost log repository 440 can be a temporary buffer or a persistent data storage area. If the ghost log repository 440 is external to the ghost agent 415, any of a variety of different mechanisms can be utilized to convey the log data to the ghost log repository 440.

For example, an intermittent communication link, such as a unicast or a point-to-point communication link can be established between the ghost log 420 and the ghost log repository 440 through which data can be conveyed. In another example, a buffer space, which can be another embodiment of ghost log 420, within the ghost agent 415 can record log information. Whenever the buffer reaches a specified volume of data, a message containing the buffered information can be conveyed to the ghost log repository 440. The buffer within the ghost agent 415 can then be cleared and used to store fresh data.

In yet another example, ghost agents 415 can convey log data to a local data server. The local data server can then convey all received log data to the ghost log repository 440 from time to time or on a periodic basis. In still another example, the ghost agent 415 can intermittently deposit log data to a local location. Then a data-reaping object can gather packets of the log data that have been locally deposited by the various ghost agents 415. The packets of log data can be conveyed to the ghost log repository 440 by the data-reaping objects.

The ghost identifier 425 can provide identification, authorization, and security related functions for the ghost agent 415. That is, the ghost identifier 425 can identify the ghost agent 415 to the various components of the grid environment 400. Accordingly, servers in the grid environment 400 can have an awareness of the ghost agent 415. The grid servers can then use policy-based controls to manage permissions, authentication, resource utilization, and security for the ghost agents 415. Ghost agents 415 adhering to the established policies can be permitted to automatically enter and exit the various grids of the grid environment 400.

The ghost agent 415 can be granted different access privileges to computing resources as the ghost agent 415 traverses from one grid in a grid environment 400 to another depending on grid-based policies. Privileges afforded the ghost agent 415 can be determined in any manner known in the art. For example, a ghost agent 415 can replicate the passwords provided by the host 405 and use the replicated passwords to provide authentication to the grid environment 400. In another example, before a ghost agent 415 can be permitted to follow an associated host 405 from one grid in the grid environment 400 to the next, a password or digital certificate unique to the ghost agent 415 can be required. The ghost agent 415 can receive the same system privilege level within the grid environment 400 as the host 405 or can receive a different privilege level.

The ghost controller 430 can manage the ghost agent 415. For example, the ghost controller 430 can establish a life span for a particular ghost agent 415 so that the ghost agent 415 self-terminates after a designated period. The ghost controller 430 can also limit the operations that can be performed by the ghost agent 415 based upon an included containment policy 470. For example, the ghost controller can calculate resource utilization values, compare these values to thresholds, and can responsively activate and/or deactivate the ghost agent 415.

In one embodiment, the ghost controller 430 can accept control signals 460 from an external source. Further, the ghost controller 430 can include a listener object capable of responding to particular events broadcasted by a corresponding notifier object. For example, a received broadcast can cause the ghost controller 430 to alter the containment policy 470. Such broadcasts can be common within frameworks that include ghost-regulating components.

While ghost log repository 440 is depicted as being external and possibly remotely located from the ghost agent 415, it should be appreciated that the ghost log repository 440 can also be an allocated memory space internal to the ghost agent 415. For example, the ghost log repository 440 can be a dynamically allocated segment of random access memory (RAM) available to the ghost agent 415 as needed.

It should be noted that there are many possible ways to implement the elements of system 400. Implementation details can depend upon the conditions of the host 405, the specifics of the ghost agent 415, and details concerning the grid environment 400. One of ordinary skill in the art can apply the teachings disclosed herein to a variety of different conditions using well-known software engineering techniques and principles.

Figure 5:
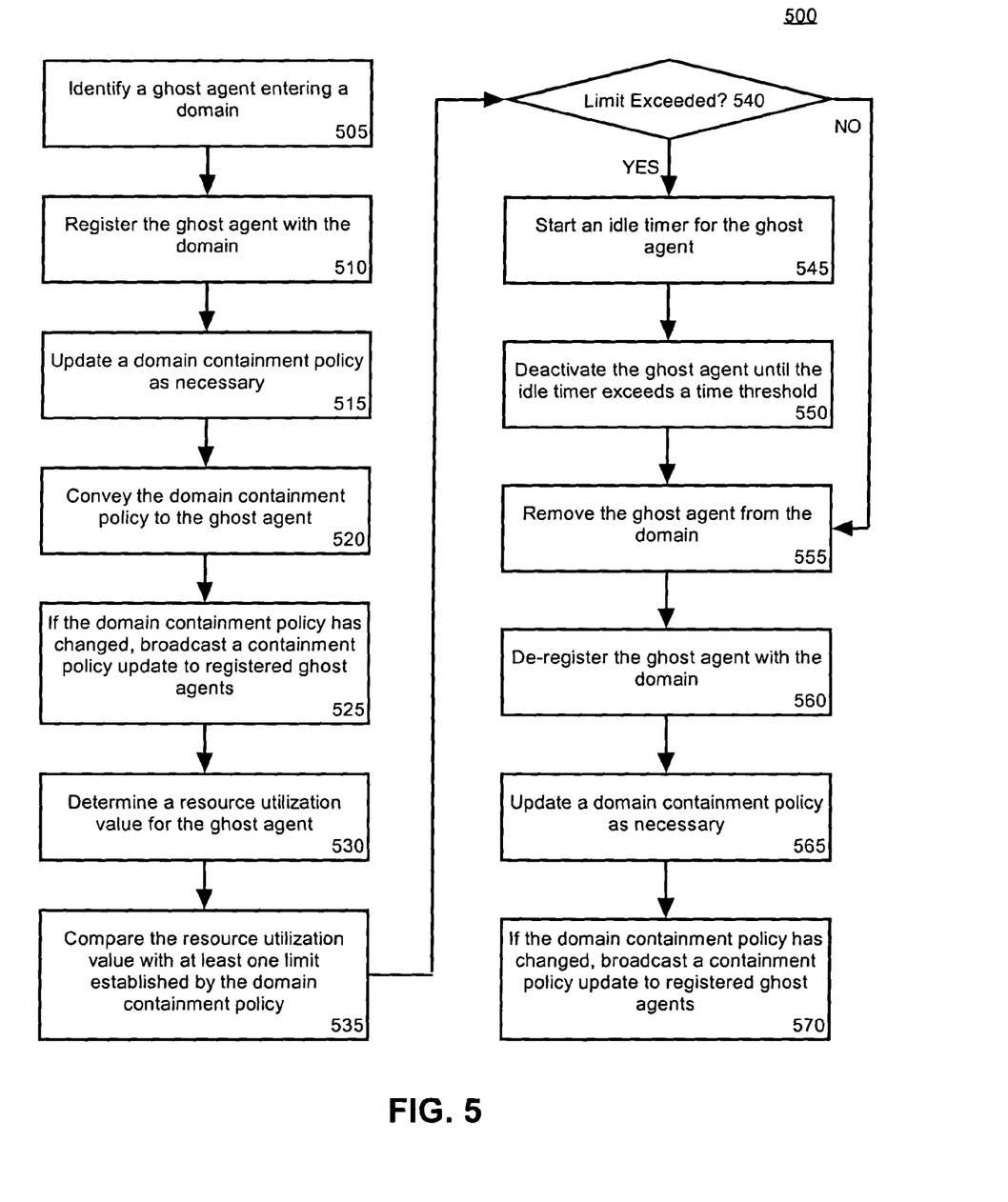
FIG. 5 is a flowchart illustrating a method for restricting resources consumed by a ghost agent according to one embodiment of the inventive arrangements disclosed herein.

FIG. 5 is a flowchart illustrating a method 500 for restricting resources consumed by a ghost agent according to one embodiment of the present invention. The method 500 can be performed in the context of a grid environment that includes at least one domain. The method 500 can begin in step 505, where a ghost agent entering a domain can be identified. In step 510, the ghost agent can register with the domain.

In step 515, a domain containment policy can be updated as necessary. In one embodiment, the domain containment policy can establish fixed resource consumption limitations for ghost agents. In such an embodiment, the domain containment policy will not require updating when a new ghost agent is registered. In another embodiment, however, the domain containment policy will need to be updated when a new ghost agent is registered or de-registered. For example, the domain containment policy can allocate a fixed resource pool to the ghost agents within the domain and equally distribute resources to registered ghost agents. For instance, if N ghost agents are in the domain having M resources, M/N resources can be available to each ghost agent in the domain. Still, resources can be apportioned in any of a variety of ways and need not be equally distributed among ghost agents.

In step 520, the domain containment policy can be conveyed to the newly registered ghost agent. In step 525, if the domain containment policy has changed as a result of step 515, an updated containment policy message can be broadcasted to registered ghost agents. In step 530, a resource utilization value can be calculated based upon the received messages. In step 535, the resource utilization value can be compared with one or more limits established by the domain containment policy. In step 540, if at least one limit is exceeded, the method can proceed to step 545, where an idle timer can be started for the ghost agent. In step 550, the ghost agent can be deactivated until the idle timer exceeds a predetermined time threshold. Once the time threshold is exceeded, the ghost agent can be re-activated and the method can proceed to step 555. If no limits are exceeded in step 540, the method can proceed directly to step 555.

In step 555, the host can move from the domain and the ghost agent can responsively follow the host. Accordingly, the ghost agent can be removed from the domain. In step 560, the removed ghost agent can be de-registered from the domain. In step 565, the domain containment policy can be updated as necessary. In step 570, if the domain containment policy has changed as a result of de-registration of the ghost agent, an updated containment policy can be broadcasted to registered ghost agents remaining in the domain.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for restricting resources consumed by ghost agents within a domain of a grid computing environment comprising the steps of:
   identifying a host, wherein the host is a software object operating within the grid environment and movable from one grid to another grid within the grid environment;
   associating a ghost agent with the host, wherein the ghost agent is configured to replicate and record at least one action of the host, wherein the ghost agent follows the movement of the associated host;
   registering the ghost agent with a ghost registry of the domain, wherein the ghost agent is de-registered when the ghost agent leaves the domain;
   responsive to said registering, conveying a containment policy to said ghost agent from the ghost registry, wherein the containment policy is dynamically altered when a ghost agent is registered or de-registered with the ghost registry and a update of the containment policy is broadcasted to registered ghost agents;
   determining a resource utilization value for the ghost agent;
   comparing the resource utilization value to a limit established by the containment policy; and
   if said limit is exceeded, preventing the ghost agent from executing at least one operation.

2. The method of claim 1, wherein said preventing step further comprises the steps of:
   deactivating said ghost agent;
   starting an idle timer for said ghost agent; and
   when said idle timer exceeds a time threshold, activating said ghost agent.

3. A system for restricting resources consumed by ghost agents within a domain of a grid environment, the system comprising:
   a host, wherein the host is a software object operating within the grid environment and movable from one grid to another grid within the grid environment;

a ghost agent associated with the host, wherein the ghost agent is configured to replicate and record at least one action of the host, wherein the ghost agent follows the movement of the associated host;

means for registering the ghost agent with a ghost registry of the domain, wherein the ghost agent is de-registered when the ghost agent leaves the domain;

means for conveying, responsive to the registering, a containment policy to the ghost agent from the ghost registry, wherein the containment policy is dynamically altered when a ghost agent is registered or de-registered with the ghost registry and a update of the containment policy is broadcasted to registered ghost agents;

means for determining a resource utilization value for the ghost agent;

means for comparing the resource utilization value to a limit established by the containment policy; and means for, preventing the ghost agent from executing at least one operation, if the limit is exceeded.

4. A machine-readable storage having stored thereon, a computer program having a plurality of code sections, said code sections executable by a computer for causing the computer to perform a method for restricting resources consumed by ghost agents within a domain of a grid computing environment comprising the steps of:

identifying a host, wherein the host is a software object operating within the grid environment and movable from one grid to another grid within the grid environment;

associating a ghost agent with the host, wherein the ghost agent is configured to replicate and record at least one action of the host, wherein the ghost agent follows the movement of the associated host;

registering the ghost agent with a ghost registry of the domain, wherein the ghost agent is de-registered when the ghost agent leaves the domain;

responsive to said registering, conveying a containment policy to said ghost agent from the ghost registry, wherein the containment policy is dynamically altered when a ghost agent is registered or de-registered with the ghost registry and a update of the containment policy is broadcasted to registered ghost agents;

determining a resource utilization value for the ghost agent;

comparing the resource utilization value to a limit established by the containment policy; and if said limit is exceeded, preventing the ghost agent from executing at least one operation.

5. The machine-readable storage of claim 4, wherein said preventing step further comprises the steps of:

deactivating said ghost agent;

starting an idle timer for said ghost agent; and when said idle timer exceeds a time threshold, activating said ghost agent.

6. A system for restricting resources consumed by a ghost agent comprising:

a processing element of a computing resource within a grid environment, wherein the processing element is associated with a domain of the grid environment, and wherein the processing element is configured for:

identifying a host, wherein the host is a software object operating within the grid environment and movable from one grid to another grid within the grid environment;

associating a ghost agent with the host, wherein the ghost agent is configured to replicate and record at least one action of the host, wherein the ghost agent follows the movement of the associated host;

registering the ghost agent with a ghost registry of the domain, wherein the ghost agent is de-registered when the ghost agent leaves the domain;

responsive to said registering, conveying a containment policy to said ghost agent from the ghost registry, wherein the containment policy is dynamically altered when a ghost agent is registered or de-registered with the ghost registry and a update of the containment policy is broadcasted to registered ghost agents;

determining a resource utilization value for the ghost agent;

comparing the resource utilization value to a limit established by the containment policy; and if said limit is exceeded, preventing the ghost agent from executing at least one operation.

* * * * *